United States Patent
Klank

(10) Patent No.: US 6,975,861 B2
(45) Date of Patent: Dec. 13, 2005

(54) CHANNEL PRESELECTION METHOD FOR A RF COMMUNICATION SYSTEM

(75) Inventor: Otto Klank, Lehrte-Arpke (DE)

(73) Assignee: Thomson Licensing, Boulogne-Billancourt (FR)

( * ) Notice: Subject to any disclaimer, the term of this patent is extended or adjusted under 35 U.S.C. 154(b) by 374 days.

(21) Appl. No.: 10/239,962

(22) PCT Filed: Apr. 7, 2001

(86) PCT No.: PCT/EP01/04017

§ 371 (c)(1),
(2), (4) Date: Sep. 25, 2002

(87) PCT Pub. No.: WO01/82644

PCT Pub. Date: Nov. 1, 2001

(65) Prior Publication Data

US 2003/0078049 A1    Apr. 24, 2003

(30) Foreign Application Priority Data

Apr. 22, 2000 (EP) .................................. 00108736

(51) Int. Cl.[7] .......................... H04Q 7/20; H04B 7/00; H04B 7/216; H04J 4/00

(52) U.S. Cl. ...................... 455/423; 455/450; 455/425; 455/421; 455/67.11; 455/67.13; 370/441; 370/478

(58) Field of Search .......................... 455/552.1, 553.1, 455/464, 450, 426.6, 462, 515, 500, 518, 455/411, 452.1, 519, 63.2, 423, 421, 425, 455/67.1, 67.13; 714/724; 380/273; 370/330, 370/342, 478, 441

(56) References Cited

U.S. PATENT DOCUMENTS

| 5,418,839 A | * | 5/1995 | Knuth et al. ................ 455/464 |
| 5,428,669 A | * | 6/1995 | McCarthy .................... 455/464 |
| 5,530,945 A | * | 6/1996 | Chavez et al. ............... 455/411 |
| 5,740,537 A | * | 4/1998 | Beming et al. .............. 455/450 |
| 5,752,164 A | * | 5/1998 | Jones ......................... 455/454 |
| 5,752,196 A | * | 5/1998 | Ahvenainen et al. ........ 455/518 |
| 5,768,380 A | * | 6/1998 | Rosauer et al. ............. 380/273 |
| 5,802,456 A | * | 9/1998 | Hulsebosch ................ 455/63.2 |
| 5,890,069 A | * | 3/1999 | Evans et al. ................ 455/462 |
| 5,918,160 A | * | 6/1999 | Lysejko et al. .............. 455/74 |
| 5,920,819 A |   | 7/1999 | Asanuma .................... 455/447 |
| 6,009,332 A |   | 12/1999 | Haartsen ..................... 455/450 |
| 6,075,792 A | * | 6/2000 | Ozluturk ..................... 370/441 |
| 6,170,071 B1 | * | 1/2001 | Wheeler ...................... 714/724 |
| 6,212,396 B1 | * | 4/2001 | Brown et al. ................ 455/464 |
| 6,223,053 B1 | * | 4/2001 | Friedmann et al. ....... 455/552.1 |
| 6,275,506 B1 | * | 8/2001 | Fazel et al. ................. 370/478 |
| 6,282,180 B1 | * | 8/2001 | Paneth et al. ............... 370/330 |
| 6,301,482 B1 | * | 10/2001 | Shohara .................... 455/452.1 |

(Continued)

FOREIGN PATENT DOCUMENTS

EP    0430173    6/1991    ............ H04Q 7/04

Primary Examiner—William Trost
Assistant Examiner—Kiet Doan
(74) Attorney, Agent, or Firm—Joseph S. Tripoli; Robert D. Shedd; Brian J. Cromarty

(57) ABSTRACT

The invention relates to a channel entering method for a RF communication system, in particular an indoor network, comprising a plurality of subscriber stations), each of said subscriber stations having a transmitter and a receiver, whereby information can be exchanged between said subscriber stations using respective transmitters and receivers and a plurality of channels available for RF communication in said RF communication system.

13 Claims, 1 Drawing Sheet

U.S. PATENT DOCUMENTS 6,307,851 B1 * 10/2001 Jung et al. .................. 370/342

6,785,540 B1 * 8/2004 Wichelman ................. 455/423

* cited by examiner

CHANNEL PRESELECTION METHOD FOR A RF COMMUNICATION SYSTEM

This application claims the benefit, under 35 U.S.C. § 365 of International Application PCT/EP01/04017, filed Apr. 7, 2001, which was published in accordance with PCT Article 21(2) on Nov. 1, 2001 in English and which claims the benefit of European patent application No. 00108736.0 filed Apr. 22, 2000.

The invention relates to a channel entering method for a RF communication system, in particular an indoor network, comprising a plurality of subscriber stations, each of said subscriber stations having a transmitter and a receiver, whereby information can be independently exchanged between said subscriber stations using respective transmitters and receivers and a plurality of channels available for RF communication in said RF communication system.

BACKGROUND

For private homes and also local area networks (LAN) developments are going on to connect all kinds of devices together, as TV, personal computer, stereo systems, telephone etc. Several devices located in an area and belonging to a group of dedicated users, for example in the same apartment or in the same building, may be considered to be part of a so-called cluster. This may also include near-by-stations outside the respective building. Information exchange between the devices of the cluster and optionally between the cluster devices and stations of other near-by-clusters may be based on wireless RF communication. However, a combination of wireless and wire line RF communication may also be provided.

For the RF communication between the devices and/or the outside stations there will only be a limited number of RF channels available. Devices of a cluster, and/or optionally such of different clusters which communicate with each other, use one (or optionally more than one) channel by sharing a plurality of time and/or frequency slots. This normally causes no interference problems. The devices and the stations of the various clusters may use/reuse the RF channels available for communication under certain conditions (distance, interference level, etc.). Therefore, communication signals from devices in other clusters in most cases cause interference problems with respect to communication of the devices of the cluster considered. In situations of high communication traffic, interference may prevent a reuse of the same channel and, if no more channels are available, it blocks usage of a desired service.

The general concept of a mixed frequency and time division multiplex communication system is described in EP-A-0 853 400. For the disclosure of the invention it is therefore expressively referred to this document.

In order to avoid conflicting situations, before entering and using a preferred channel for communication each device separately performs a channel testing procedure. In the channel testing procedure, on the basis of communication parameters the preferred channel is tested whether it enables RF communication, preferably optimised communication over the preferred channel.

INVENTION

It is an object of the present invention to disclose a channel entering method in a RF communication system for improving RF communication channel efficiency.

According to the invention a channel entering method for a RF communication system, in particular an indoor network, comprising a plurality of subscriber stations is provided, each of said subscriber stations having a transmitter and a receiver, whereby information can be independently exchanged between said subscriber stations using respective transmitters and receivers and a plurality of channels available for RF communication in said RF communication system, said method comprising the steps of:
a) providing a first set of communication parameters;
b) using said first set of communication parameters to test a first group of channels of said plurality of channels for RF communication between a first and a second subscriber station of said plurality of subscriber stations;
c) providing, if for said RF communication between said first and said second subscriber station no channel of said first group of channels meets said first set of communication parameters, a second set of communication parameters;
d) using said second set of communication parameters to test a second group of channels for said RF communication between said first and said second subscriber station, wherein said second group of channels comprises said first group of channels at least partially;
e) entering one channel of said second group of channels tested in step d), if for said RF communication between said first and said second subscriber station said channel meets said second set of communication parameters.

According to a second embodiment of the invention a channel entering method for a RF communication system, in particular an indoor network is provided, comprising a plurality of subscriber stations (S1 to Sn, $n \geq 2$), each of said subscriber stations (S1 to Sn) having a transmitter and a receiver, whereby information can be exchanged between said subscriber stations (S1 to Sn) using respective transmitters and receivers and a plurality of channels available for RF communication in said RF communication system, said method comprising the steps of:
a) providing at least a first set of communication parameters (I1, M1) and a second set of communication parameters (I2, M2);
b) using said first and second set of communication parameters (I1, M1) to test a group of channels (C1 to Cm, $m \geq 2$) of said plurality of channels for RF communication between a first and a second subscriber station (Sx, Sy; $1 \leq x \leq n$, $1 \leq y \leq n$) of said plurality of subscriber stations (S1 to Sn) in order to check whether a channel meets the condition of the first set of communication parameters and if not, whether it meets the second set of communication parameters;
c) sorting the available channels in accordance whether they meet the first or second set of communication parameters;
d) entering one channel (C*x, $1 \leq x \leq m$) of said available channels (C*1 to C*m) tested in step b), in accordance to the sorting order.

The disclosed methods improve the utilisation or channel efficiency and avoids negative consequences due to more frequent (re)use of the channels. On the basis of the acquisition information sent by said first subscriber stations and indicating that said channel meeting said second set of communication parameters is entered, the other subscriber stations of said plurality of subscriber stations, especially in the same cluster, can decide whether or not they also want to use or reuse said channel entered by said one subscriber station. Evaluating said acquisition information received from said first subscriber station, another subscriber station of said plurality of subscriber stations may decide not to use or reuse said channel entered by said one subscriber station, since entering of said channel by the other subscriber station may lead to a break down of communication performed by the first subscriber station. Therefore, the method disclosed improves efficiency of RF communication in the system and decreases the overall failure rate of the RF communication system.

DRAWINGS

Exemplary embodiments of the invention are illustrated in the drawings and are explained in more detail in the following description.

EXEMPLARY EMBODIMENTS

Figure 1:
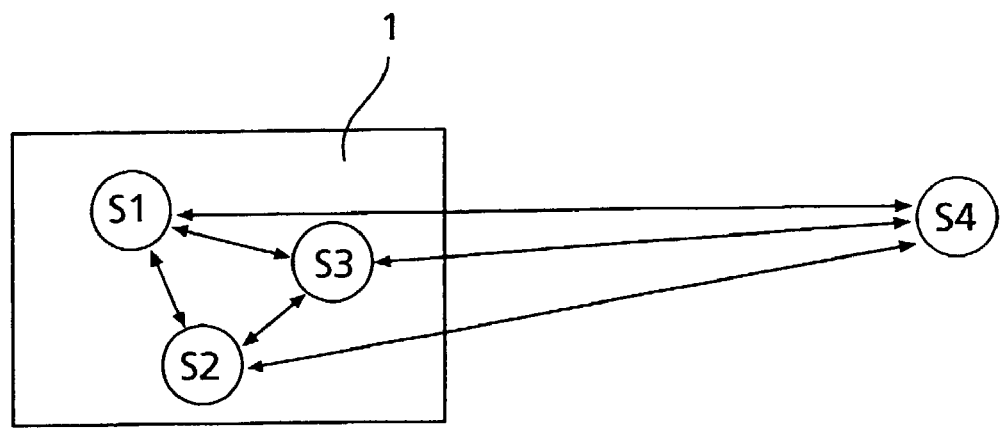
FIG. 1 shows a schematic representation of a RF communication system.

FIG. 1 shows a RF communication system with a plurality of subscriber stations S1, . . . ,S4. Three of the subscriber stations S1, S2, S3 are located within an area or cluster 1, as an apartment or a building. One subscriber station S4 is located outside the cluster 1. Subscriber station S4 is a transceiver station transmitting RF information that in principle can be received by subscriber stations S1 and/or S2 and/or S3. In addition, RF signals can be independently exchanged between the cluster subscriber stations S1, S2, S3. There may be some more stations (not shown) which cannot be received reliably by the subscriber stations S1, S2, S3 but which generate an interference level at the location of stations S1, S2, S3. The subscriber stations S1, S2, S3 may be part of a local area network (LAN) comprising, for example TES, personal computers, stereo systems, telephones etc.

For communication between the subscriber stations S1, S2, S3 and between S4 and further stations (not shown) and optionally between stations S1 S2, S3, S4 there will only be a limited number of RF channels available. The subscriber stations S1, S2, S3, S4 use the RF channels available for communication by sharing a quantity of time and/or frequency slots of a channel, and, if appropriate (e.g. different clusters), by using different channels.

Before a RF channel is used for communication between two or more subscriber stations, for example between S1 and S2, the channel is tested to check whether the channel meets requirements necessary for RF communication over the channel. A set of communication parameters is used to proof a channel's usability for RF communication. In general, communication parameters are used to monitor the channel's transmission quality. A channel acquisition or entering process is started with testing channels available whether they are free or occupied.

Figure 2:
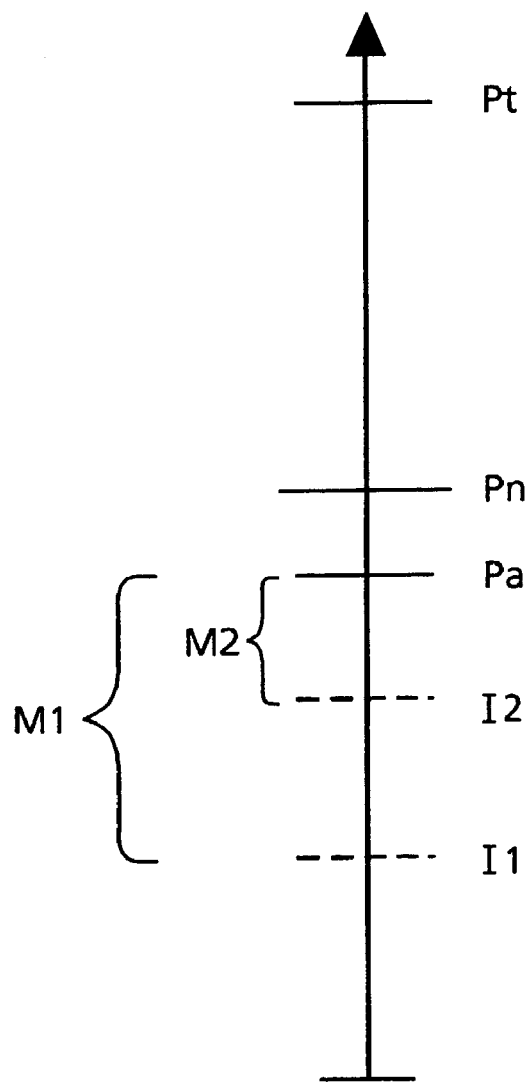
FIG. 2 shows a diagram explaining different communication parameters.

In FIG. 2 examples of communication parameters usable for channel testing are depicted. During channel testing procedure, a certain interference power reference value I1 or I2 and/or a certain margin M1 or M2 may be applied in order to separate between channels usable for communication between subscriber stations S1 and S2 and channels occupied, respectively. The interference power reference values I1 and I2 represent different levels of interference power resulting from RF communication other than the RF communication under test. The test procedure may include more sophisticated methods, e.g. a correlation of the received channel signals with known (assumed) pattern or sequences in order to be able to detect relatively weak signals and distinguish between system-conform signals/interference and others (which may have different impacts and may imply application of different parameter sets).

In addition, the channel test procedure needs to take into consideration a margin M1, M2 for worse conditions (e.g. moving subscriber stations and/or switching on another station of the considered cluster and/or a station belonging to an existing (operating) but interfering cluster), which affect the RF communication between subscriber stations S1 and S2 and may result in further decrease of channel efficiency or communication quality. In any case, the sum (I1+M1; I2+M2) of the respective interference power reference value I1 or I2 and the respective margin M1 or M2 has to be lower than an acceptable interference power Pa (see FIG. 2) which also is a characteristic channel parameter.

Thus, to be on the safe side, a relative big margin M1 or M2 has to be applied in channel testing. This presumably leads to a channel utilisation or efficiency far beyond theoretical values or beyond such values that could be reached if the positioning of the devices would have been known. If an adequate margin is not applied and no other measures are taken, RF communication may partially be interrupted, or the RF communication system may break down in various clusters.

The difference between a minimal input power Pm (see FIG. 2) and the interference power reference value I1 or I2 is sometimes referred to as interference distance. In FIG. 2, a transmitted power Pt and a nominal input power Pn are also depicted.

In the following a method for entering a RF channel used for communication between two subscriber stations, for example between subscriber stations S1 and S2, is described. In a first step, a set of communication parameters is provided. In the example described the set of communication parameters comprises the interference power reference value I1 and the margin M1 (see FIG. 2). However, the new channel entering method is independent of the number and the nature of the communication parameters used for channel testing. The set of communication parameters is selected to provide for communication between subscriber stations S1 and S2 a RF channel of good quality, preferably high quality.

The set of communication parameters is used to test a first group of channels available for RF communication between subscriber stations S1 and S2. Following, if for said RF communication between subscriber stations S1 and S2 no channel of the first group of channels meets the set of communication parameters I1 and M1, another set of communication parameters I2 and M2 is provided. The other set of communication parameters I2 and M2 is selected to provide for communication between subscriber stations S1 and S2 a RF channel of sufficient quality, so that RF information can be transmitted.

Then the other set of communication parameters I2 and M2 is used to test a second group of channels available for the RF communication between the subscriber stations S1 and S2, wherein said second group of channels comprises said first group of channels at least partially.

Following, if at least one of the channels of the second group of channels meets the other set of communication parameters I2 and M2 for the RF communication between the subscriber stations S1 and S2, the at least one channel is entered for RF communication between the subscriber stations S1 and S2. After that, an acquisition and channel quality information is sent from the subscriber station S1 to the other subscriber stations of the cluster (S2, S3) and S4, to indicate that the at least one channel meeting the other set of communication parameters I2 and M2 is entered for the RF communication between the subscriber stations S1 and S2.

Optionally, during channel testing, data characterising or identifying channels tested, for example a channel count number and/or another characteristic value, may be stored for all channels providing better conditions than defined by the other set of communication parameters I2 and M2. The channel providing the best results with respect to the set of communication parameter I1 and M1 or the other set of communication parameter I2 and M2 may be selected for further actions, especially for further RF communication actions.

If, while testing the channels available for RF communication in the Rf communication system on the basis of the set of communication parameters I1 and M1 and the other set of communication parameters I2 and M2, no channel meeting communication parameters I1/M1 or I2/M2 is found, at least one further set of communication parameters may be provided. The at least one further set of communication parameters is selected to provide for communication between subscriber stations S1 and S2 a RF channel of still sufficient quality, so that RF information can be transmitted between the subscriber stations S1 and S2.

According to a further aspect of the invention, the at least one channel selected and entered for RF communication between the subscriber stations S1 and S2 may be considered as a provisional selection. The provisionally selected channel may be used for a first set-up RF communication between the subscriber stations S1 and S2. The provisionally selected channel could later be reviewed on 'both sides', i.e. on the side of the subscriber station S1 and on the side of the subscriber station S2, respectively, and be selected for further communication between the subscriber stations S1 and S2, only if RF communication can be performed with sufficient transmission quality on 'both sides'.

Optionally, if the channel test requirements of the other set of communication parameters I2 and M2 are fulfilled, an acknowledge information is sent form subscriber station S2 to the subscriber station S1, the acknowledge information indicating that the at least one channel has been accepted.

It is to understand, that the channel entering method described is essentially independent of the method used for channel testing as well as the set of communication parameters. In any case, after entering a channel for communication by one of the subscriber stations the other subscriber stations of the RF communication system are informed by means of the acquisition information.

The person skilled in the art will understand, that the described channel entering method may be performed by all subscriber stations S1, ..., S4, so that all subscriber stations S1, ..., S4 can inform each other with respect to RF channels entered by the respective subscriber station for RF communication in the RF communication system.

What is claimed is:

1. Channel entering method for a RF communication system, in particular an indoor network, comprising a plurality of subscriber stations (S1 to Sn, $n \geq 2$), each of said subscriber stations (S1 to Sn) having a transmitter and a receiver, whereby information can be exchanged between said subscriber stations (S1 to Sn) using respective transmitters and receivers and a plurality of channels are available for RF communication in said RF communication system, said method comprising the steps of:

a) providing a first set of communication reference parameters (I1, M1);
   b) using said first set of communication reference parameters (I1, M1) to test a first group of channels (C1 to Cm, $m \geq 2$) of said plurality of channels for RF communication between a first and a second subscriber station (Sx, Sy; $1 \leq x \leq n, 1 \leq y \leq n$) of said plurality of subscriber stations (S1 to Sn);
   characterized by the further steps of:
   c) providing, if for said RF communication between said first and said second subscriber station (Sx, Sy) no channel of said first group of channels (C1 to Cm) meets said first set of communication reference parameters (I1, M1), a second set of communication reference parameters (I2, M2);
   d) using said second set of communication reference parameters (I2, M2) to test a second group of channels (C*1 to C*m, $m \geq 2$) for said RF communication between said first and said second subscriber station (Sx, Sy), wherein said second group of channels (C*1 to C*m) comprises said first group of channels (C1 to Cm) at least partially;
   e) entering one channel (C*x, $1 \leq x \leq m$) of said second group of channels (C*1 to C*m) tested in step d), if for said RF communication between said first and said second subscriber station (Sx, Sy) said channel (C*x) meets said second set of communication reference parameters (I2, M2);
   wherein RF communication between said first and said second subscriber stations (Sx, Sy) based on said first set of communication reference parameters (I1, M1) is of higher quality as compared to RF communication between said first and said second subscriber station (Sx, Sy) based on said second set of communication reference parameters (I2, M2).

2. Method according to claim 1, characterized in that said method comprises the further step of:
   f) sending acquisition information from said first subscriber station (Sx) to other subscriber stations (S1, ..., Sx−1, Sx+1, ... Sn) of said plurality of subscriber stations (S1 to Sn) in said RF communication system, to indicate that said channel (C*x) meeting said second set of communication reference parameters (I2, M2) is entered for said RF communication between said first and said second subscriber station (Sx, Sy).

3. Channel entering method for a RF communication system, in particular an indoor network, comprising a plurality of subscriber stations (S1 to Sn, $n \geq 2$), each of said subscriber stations (S1 to Sn) having a transmitter and a receiver, whereby information can be exchanged between said subscriber stations (S1 to Sn) using respective transmitters and receivers and a plurality of channels available for RF communication in said RF communication system, said method comprising the steps of:

a) providing at least a first set of communication reference parameters (I1, M1) and a second set of communication reference parameters (I2, M2);
   b) using said first and second set of communication reference parameters (I1, M1) to test a group of channels (C1 to Cm, $m \geq 2$) of said plurality of channels for RF communication between a first and a second subscriber station (Sx, Sy; $1 \leq x \leq n, 1 \leq y \leq n$) of said plurality of subscriber stations (S1 to Sn) in order to check whether a channel meets the condition of the first set of communication reference parameters and if not, whether it meets the second set of communication reference parameters;

c) sorting the available channels in accordance whether they meet the first or second set of communication reference parameters;

d) entering one channel (C*x, 1 £ x £ m) of said available channels (C*1 to C*m) tested in step b), in accordance to the sorting order;

wherein RF communication between said first and said second subscriber stations (Sx, Sy) based on said first set of communication reference parameters (I1, M1) is of higher quality as compared to RF communication between said first and said second subscriber station (Sx, Sy) based on said second set of communication reference parameters (I2, M2).

4. Method according to claim 3, characterized in that said method comprises the further step of:

e) sending acquisition information from said first subscriber station (Sx) to other subscriber stations (S1, . . . ,Sx−1,Sx+1, . . . Sn) of said plurality of subscriber stations (S1 to Sn) in said RF communication system, if said channel (C*x) meets said second set of communication reference parameters (I2, M2), only to indicate that said channel (C*x) meeting said second set of communication reference parameters (I2, M2) is entered for said RF communication between said first and said second subscriber station (Sx, Sy).

5. Method according to claim 1, characterized in that in case that none of the available channels meet the first set of communication reference parameters, but some of the available channels meet the second set of communication reference parameters, the interference values are measured and classified and that the channel with the lowest interference value is entered for communication.

6. Method according to claim 1 wherein said step d) comprises the steps of:

storing data identifying at least two of said second group of channels (C*1 to C*m), each of said at least two channels meeting said second set of communication reference parameters (I2, M2); and selecting one (C*x) of said at least two channels; and entering said one (C*x) of said at least two channels for RF communication between said first and said second subscriber station (Sx, Sy).

7. Method according to claim 1, characterized in that, said first and said second set of communication reference parameters comprising a first interference reference value (I1) and/or a first margin (M1) and a second interference reference value (I2) and/or a second margin (M2), respectively.

8. Method according to claim 1, characterized in that, said acquisition information comprises information on said second set of communication reference parameters (I2, M2).

9. Method according to claim 1, characterized in that, said channel entering step is performed as a provisional channel selection, said channel (C*x) is used for a set-up RF communication between said first subscriber station (Sx) and said second subscriber station (Sy), and said provisional channel selection is accepted by selecting said channel (C*x) for further RF communication, if within said set-up RF communication said second subscriber station (Sy) communicates to said first subscriber station (Sx), that said channel (C*x) meeting said second set of communication reference parameters (I2, M2) is sufficient for further RF communication between said first and said second subscriber stations (Sx, Sy).

10. Method according to claim 1, characterized in that, before said step of entering said channel, a third set of communication reference parameters is provided, and said third set of communication reference parameters is used for testing said first and/or said second group of channels (C1 to Cm, C*1 to C*m), wherein said RF communication between said first and said second subscriber stations (Sx, Sy) based on said second set of communication reference parameters (I2, M2) is of higher quality as compared to RF communication between said first and said second subscriber stations (Sx, Sy) based on said third set of communication reference parameters.

11. Method according to claim 10, characterized in that, said third set of communication reference parameters comprising a third interference reference value and/or a third margin.

12. Method according to claim 1, characterized in that, said RF communication between said first and said second subscriber stations (Sx, Sy) comprising wireless communication.

13. Method according to claim 1, characterized in that, said RF communication between said first and said second subscriber stations (Sx, Sy) comprising wireline communication.

* * * * *